United States Patent
Ramésh et al.

(10) Patent No.: US 6,917,629 B1
(45) Date of Patent: Jul. 12, 2005

(54) RATE DETECTION IN RADIO COMMUNICATION SYSTEMS

(75) Inventors: Rajaram Ramésh, Cary, NC (US); Gregory E. Bottomley, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 673 days.

(21) Appl. No.: 09/152,063

(22) Filed: Sep. 11, 1998

(51) Int. Cl.[7] ................................................. H04J 3/06
(52) U.S. Cl. ...................... 370/509; 370/280; 370/336; 340/426; 375/225; 375/120; 380/48
(58) Field of Search ................................. 370/509, 280, 370/336; 340/426; 375/225, 120; 380/48

(56) References Cited

U.S. PATENT DOCUMENTS

| | | | |
|---|---|---|---|
| 5,230,003 A | 7/1993 | Dent et al. ..................... | 371/43 |
| 5,406,593 A | * 4/1995 | Chennakeshu et al. ........ | 380/48 |
| 5,566,206 A | 10/1996 | Butler et al. ................. | 375/225 |
| 5,638,408 A | 6/1997 | Takaki ......................... | 375/341 |
| 5,689,511 A | 11/1997 | Shimazaki et al. ........... | 370/545 |
| 5,729,193 A | * 3/1998 | Grasmann .................... | 340/426 |
| 5,757,844 A | * 5/1998 | Fukawa et al. .............. | 375/200 |
| 5,757,850 A | 5/1998 | Takaki ......................... | 375/225 |
| 5,774,496 A | 6/1998 | Butler et al. ................. | 375/225 |
| 5,907,586 A | 5/1999 | Katsuragawa et al. ...... | 375/341 |
| 5,978,414 A | * 11/1999 | Nara et al. ................... | 375/225 |
| 6,112,325 A | 8/2000 | Burshtein .................... | 714/774 |
| 6,137,840 A | 10/2000 | Tiedemann, Jr. et al. ... | 375/297 |
| 6,175,590 B1 | * 1/2001 | Stein ........................... | 375/225 |
| 6,202,188 B1 | 3/2001 | Suzuki et al. ................ | 714/758 |

FOREIGN PATENT DOCUMENTS

| | | |
|---|---|---|
| EP | 711 056 A | 5/1996 |
| EP | 763 902 A | 3/1997 |
| EP | 817 440 A | 1/1998 |
| GB | 2 301 999 | 12/1996 |
| GB | 2 305 088 A | 3/1997 |
| GB | 2305088 | 3/1997 |
| WO | WO 99/08425 | 2/1999 |
| WO | WO 00/16512 | 3/2000 |

OTHER PUBLICATIONS

Cohen, Edith et al., "Multi–rate Detection for the IS–95 CDMA Forward Traffic Channels." IEEE 1995 Global Telecommunications Conference (GLOBECOM '95), Singapore, Nov. 13–17, 1995.

Forney, G. David, Jr., "The Viterbi Algooirhm." Proceedings of the IEEE, vol. 61, No. 3, Mar. 1973.

European Search Report re RS 101683 Date of mailing of search: Mar. 18, 1999.

Y. Okumura et al., "*Variable–Rate Data Transmission with Blind Rate Detection for Coherent DS–CDMA Mobile Radio*", IEICE Transactions on Communications, vol. E81–B, No. 7, pp. 1365–1373 (Jul. 1998).

Y. Okumura et al., "*Variable–Rate Data Transmission with Blind Rate Detection for Coherent DS–CDMA Mobile Radio*", Electronics Letters, vol. 33, No. 24, pp. 2026–2027 (Nov. 20, 1997).

(Continued)

*Primary Examiner*—Chi Pham
*Assistant Examiner*—Ronald Abelson
(74) *Attorney, Agent, or Firm*—Coats & Bennett, P.L.L.C.

(57) ABSTRACT

An improved system and method for rate detection of transmitted signals is disclosed for use in a IS-95 CDMA downlink. For each speech frame, one of four possible bit rates is used to encode the frame according to the standard. The present invention describes a receiver and various processes that are able to detect which rate was sent without the aid of flag bits or other mode indication information. According to various embodiments of the invention different rate detection processes which can exploit additional code information, such as CRC checks and convolutional coding, are disclosed.

7 Claims, 8 Drawing Sheets

OTHER PUBLICATIONS

S. Czaja et al., "*Variable Data Rate Viterbi Decoder with Modified Lova Algorithm*", 1995 IEEE TenCon. IEEE Region Ten International Conference on Microelectronics and VLSI, Hong Kong, pp. 472–475 (Nov. 6–10, 1995).

C. N. Sheung et al., "*Rate Determination Algorithms in IS–95 Forward Traffic Channels*", VTC '98 48$^{th}$ IEEE Vehicular Technology Conference, pp. 2187–2191, vol. 3 (May 18–21, 1998).

Czaja, S., et al.: "Variable Data Rate VITERBI Decoder with Modified LOVA Algorithm", 1995 IEEE Tencom. IEEE Region Ten International Conference on Microelectronics and VLSI, Hong Kong, Nov. 6–10, 1995, pp. 472–475.

Cohen, E., et al.: "Multi–Rate Detection for the IS–95 CDMA Forward Traffic Channels", Globecom '95. IEEE Global Telecommunications Conference, Singapore, vol. 3, Nov. 14–16, 1995, pp. 1789–1793.

* cited by examiner

RATE DETECTION IN RADIO COMMUNICATION SYSTEMS

BACKGROUND

The present invention relates to the use of code division multiple access (CDMA) communication techniques and cellular radio telephone communication systems, and more particularly, to a method and apparatus for rate detection of a transmitted signal for direct sequence-code division multiple access (DS-CDMA) communication techniques.

CDMA is a multiple access method, which is based on a spread spectrum modulation technique, that has in recent years been applied to commercial cellular radio systems, in addition to the previously used methods of Frequency Division Multiple Access (FDMA) and Time Division Multiple Access (TDMA). Currently, channel access in cellular systems is commonly achieved using FDMA and TDMA. In an FDMA system, a communication channel is formed by a signal radio frequency band in which a signal's transmission power is concentrated. Interference with adjacent channels is limited by the use of band pass filters that only pass signal energy within the specified frequency band. Thus, as each channel is assigned a different frequency, system capacity is limited by the available frequencies as well as by limitations imposed by channel reuse.

In TDMA systems, a channel consists of time slots in a periodic frame of time slots which divide a frequency in one or more time. A given signal's energy is confined to one of these time slots. Adjacent channel interference is limited by the use of guard bands and a time gate or other synchronization element that only passes signal energy received at the proper time.

With FDMA, TDMA systems or hybrid FDMA/TDMA systems, one goal is to ensure that two strong, interfering signals do not occupy the same frequency at the same time. In contrast, CDMA allows signals to overlap in both time and frequency. Thus, CDMA signals share the same frequency spectrum in present day systems. In the frequency or the time domain, the multiple access signals appear to be "on top of" each other.

In CDMA, the narrow-band data signal of the user is modulated by a pseudo random sequence, called the spreading code, having a broader band than the data signal. In connection with modulation, the signal spreads to a relatively wide band. For example in known CDMA systems, bandwidths such as 1.25 MHz, 10 MHz and 50 MHz have been used.

The spreading code consists of a number of bits and the bit rate of the spreading code is much higher than that of the data signal. The bits of the spreading code are called chips in order to distinguish them from data bits and data symbols. Each data symbol of the user is multiplied by the chips of the spreading code. Thus, the narrow-band data signal spreads to the frequency band to be used. The ratio between the bit rate of the spreading code and the bit rate of the data signal is called the spreading ratio of the CDMA system.

In some systems, each connection has a unique, orthogonal spreading code so that the data signals of several users can be transmitted simultaneously on the same frequency band without mutual interference. Correlations are performed to extract desired signals from the receiver. The receivers then restore the band of the signal to its original bandwidth. Signals arriving at the receiver and containing spreading codes associated with other receivers do not correlate in an ideal case, but retain their wide band and thus appear as noise in the receivers. The spreading codes used by such systems are preferably selected in such a way that they are mutually orthogonal, i.e., they do not correlate with each other, as for example, Walsh codes.

There are a number of advantages associated with CDMA communication techniques. The capacity limits of CDMA-based cellular systems are projected to be several times that of existing analog technology as a result of the properties of a wideband CDMA system, such as improved interference diversity, voice activity gating, and reuse of the same spectrum in interference diversity.

In order to transmit a voice signal, the signal is converted from analog to digital and then encoded by a speech coder. According to the U.S. standard entitled "Mobile Station Base Station Compatibility Standard for Dual-Mode Wideband Spread Spectrum Cellular Systems", commonly known as IS-95, which is hereby incorporated by reference, a speech coder for transmission of voice signals uses a variable rate to encode the voice signals that are to be transmitted via the CDMA system. Four different information bit rates are possible in systems designed in accordance with this standard. The signals may additionally be encoded in order to facilitate error detection and correction, caused by transmitting the signal, through the use of a checksum, such as a cyclical redundancy check (CRC), block coding, convolutional coding, or combinations of all three. According to the IS-95 system standard the signals that are to be transmitted are convolutionally encoded using a ½ rate coder.

In convolutional coding, information bits are encoded and decoded in such a way as to determine information contained in bits which may have been destroyed in transmission. A convolutional code is typically described by the rate of the code, its constraint length, and various parity equations. If a ½ convolutional coder is used, then the output of the convolutional coder, for each 20 ms frame, typically has one of four sizes, for example, 384 bits, 192 bits, 96 bits, or 48 bits, corresponding to one of the four different possible rates of operation for the speech encoder, referred to as rates 1, 2, 3, and 4 respectively. In order to obtain the same number of encoded output bits for each of the different data rates, the data bits are repeated at different rates by a variable rate repeat coder, for example, in order to achieve 384 bits per frame. In order to keep the bit energy constant, the powers of the transmitted bits are scaled by factors of 1, ½, ¼, and ⅛ corresponding to the four different rates respectively. In addition, CRC check bits may be included for rates 1 and 2 (corresponding to 384 bits and 192 bits) but are not used at the lower rates 3 and 4.

In order to save overhead in the number of transmitted bits, no information or flag bits regarding the rate at which the voice signal was encoded by the speech coder are transmitted with the signals. This in turns leads to a significant problem for the receiver which must then determine at which of the four rates was the received voice signal encoded so that the receiver can properly decode the received data frames. This problem is commonly known in the industry as blind rate detection.

Previously at least two different solutions to the problem of blind rate detection of the received encoded signals have been proposed in association with the IS-95 system standard. According to one method, as seen in the IS-95 specification, the received signal is decoded four times, i.e., once each assuming a different one of the four possible data rates. The decoded signal is then re-encoded for all four rates and the number of positions with errors in the re-encoded signal and the received signal are compared. The CRC information is then used (for rates 1 and 2) in addition to the number of errors to make a decision regarding which of the assumed rates is correct. Another solution has been proposed whereby attempts to determine the rate are made by identifying patterns of repeated bits from the four rates, as described in "Multi-rate detection for the IS-95 CDMA forward traffic channels," by E. Cohen et al., IEEE 1995 Global Telecommunications Conference (GLOBECOM '95), Singapore, Nov. 13–17, 1995.

Though each of the above proposed solutions are conceptionally simple, both solutions have inherent disadvantages. The first solution requires a considerable amount of fine tuning and the determination of many thresholds to work properly. As a result, a considerable amount of unnecessary processing takes place since the received signal is processed four times. The second solution is also problematic because its performance requires considerable additional processing. In addition, the accuracy in determining the correct rate according to this second solution is less than optimal. Therefore, there is a need for an improved means of blind rate detection and decoding for use with CDMA systems.

SUMMARY

Accordingly, it is an object of the present invention to provide an improved system and method for variable rate detection of encoded signals in CDMA systems.

It is a further object of the present invention to provide rate detection that is able to utilize information regarding convolutional coding provided in the transmitted signal to determine a rate.

It is yet a further object to improve receiver decoding efficiency of CDMA transmitted signals by providing a receiver's speech decoder with the variable rate of the encoded transmitted signal without requiring decoding at all possible rates.

The foregoing and other objects are accomplished through implementation of a novel method and system for rate detection for use in CDMA systems. According to the present invention, it has been determined that the set of sequences is, in general, different for each rate and for rates that are lower, each allowable sequence will be made up of sequences of repeated bits. According to a first exemplary embodiment, usable for example in systems designed in accordance with IS-95, for each of the four possible data rates described above, the most likely sequence of transmitted bits is determined. The most likely sequence is the one that maximizes the total correlation with a received sequence of soft bits and postulated sequence of bits.

According to this exemplary embodiment, the invention operates in the same manner whether convolutional coding utilized to determined the rate or not. When convolutional coding is not exploited the most likely sequence at each rate is determined by a soft combining of the soft bit values that correspond to the repeated bits that were transmitted in association with the variable rate. According to this embodiment, the correlation is the sum of the absolute values of the soft combined bit values. When convolutional coding is exploited, the most likely sequence can be determined by using a Viterbi decoder utilizing a correlation metric. According to this embodiment the correlation is the metric at the all-zero state (due to the use of tail bits) at the last stage of the decoding trellis.

According to an alternative exemplary embodiment of the present invention, the rate detector includes a rate estimator. The rate estimator determines the most likely sequences by minimizing the total squared error between the received sequence and the postulated received sequence generated using an allowable sequence of bits and knowledge of the channel estimates (e.g., a channel tap of the pilot channel).

According to yet another alternative embodiment, the rate detector makes use of a maximum a posteriori (MAP) estimator for rate detection. This embodiment optionally makes use of the knowledge of the signal to noise ratio in the channel. The signal to noise ratio can be estimated, for example, using signal strength and other correlation measurements on the pilot and traffic channels.

According to any of the exemplary embodiments the rate detection can be further refined using the CRC information that is present in rates 1 and 2. For example, if a sequence of bits is postulated to be at rates 1 or 2, the CRC can be checked. If the CRC is determined to be correct, then the postulated rate is determined to be the actual rate as it is highly unlikely that any other rate has been transmitted.

Finally, additional extrinsic information not found in the coding can also be used to further aid in the decision regarding which rate has been transmitted. Examples of such information include probabilities of the various rates, allowable sequences of rate changes, and the like.

BRIEF DESCRIPTION OF THE DRAWINGS

The features and advantages of the present invention will become apparent from the detailed description set forth below when taken in conjunction with the drawings, in which.

DETAILED DESCRIPTION

Figure 1:
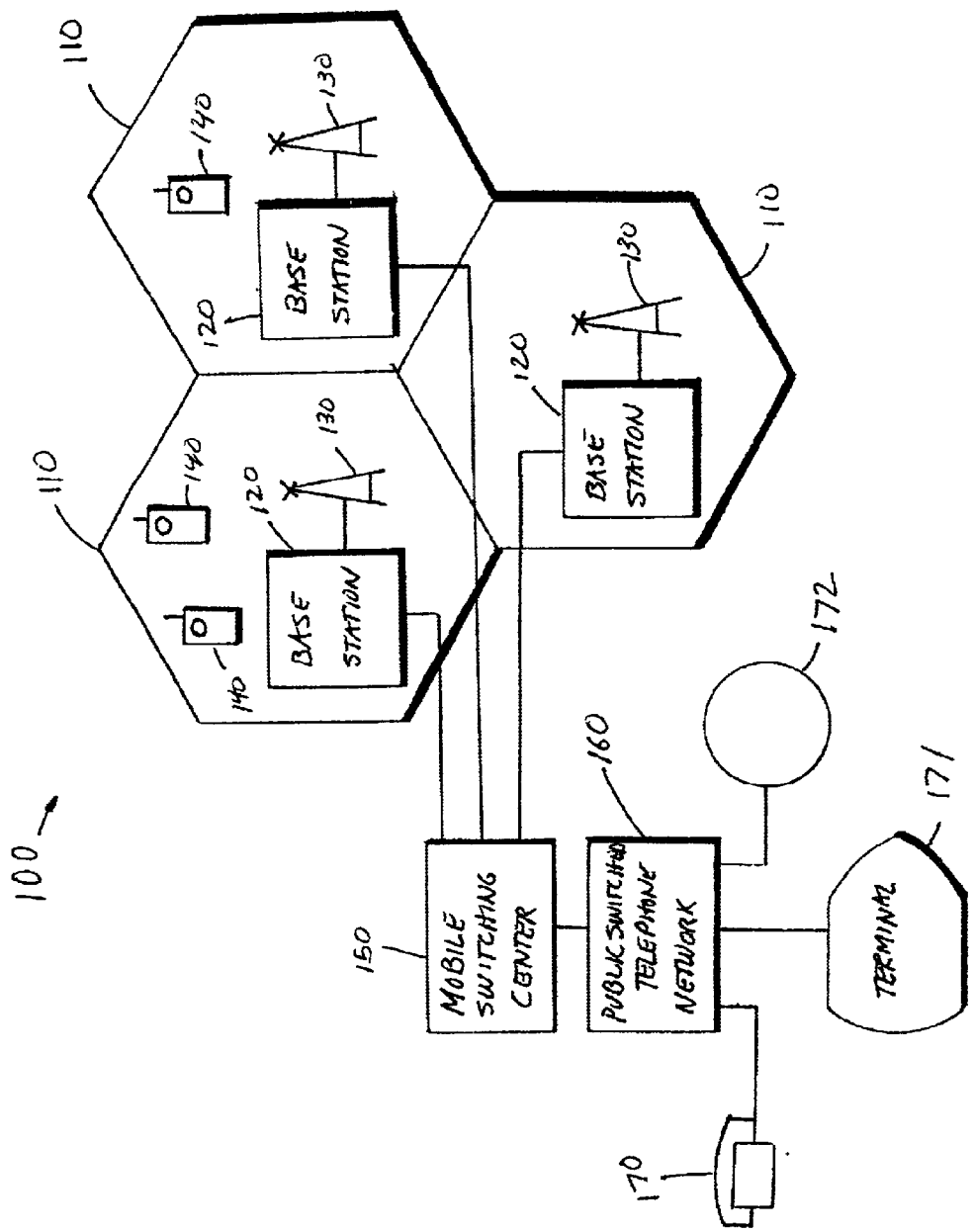
FIG. 1 is a schematic representation of communication links in a portable cellular communication system.

The various features of the invention will now be described with respect to the figures, in which like parts are identified with the same reference character.

An exemplary cellular radio communication system 100 is illustrated in FIG. 1. As shown in FIG. 1, a geographic region served by the system is subdivided into a number of smaller regions of radio coverage known as cells 110, each cell having associated with it a respective radio base station 120. Each radio base station 120 has associated with it a plurality of transmit and receive radio antennas 130. One skilled in the art will appreciate that the use of hexagonal-shaped cells 110 is employed as a graphically convenient way of illustrating areas of radio coverage associated with a particular base station 120. In actuality, cells 110 may be irregularly shaped, overlapping, and not necessarily contiguous. Each cell 110 may be further subdivided into sectors according to known methods. Distributed within cells 110 are a plurality of mobile stations 140. In practical systems the number of mobile stations is much greater than the number of cells. Base stations 120 comprise, among other things, a plurality of base station transmitters and base station receivers (not shown) which provide two-way radio communication with mobile stations 140 located within their respective cells. As illustrated in FIG. 1, base stations 120 are coupled to the mobile telephone switching office (MTSO) 150 which provides a connection to the public switched telephone network (PSTN) 160 and henceforth to communication devices 170, 171, 172, which may be a handset, terminal, or other communications device, respectively. According to an exemplary embodiment the present invention, radio communications between the base stations and the mobile stations are effected using direct sequence code division multiple access (DS-CDMA).

Figure 2:
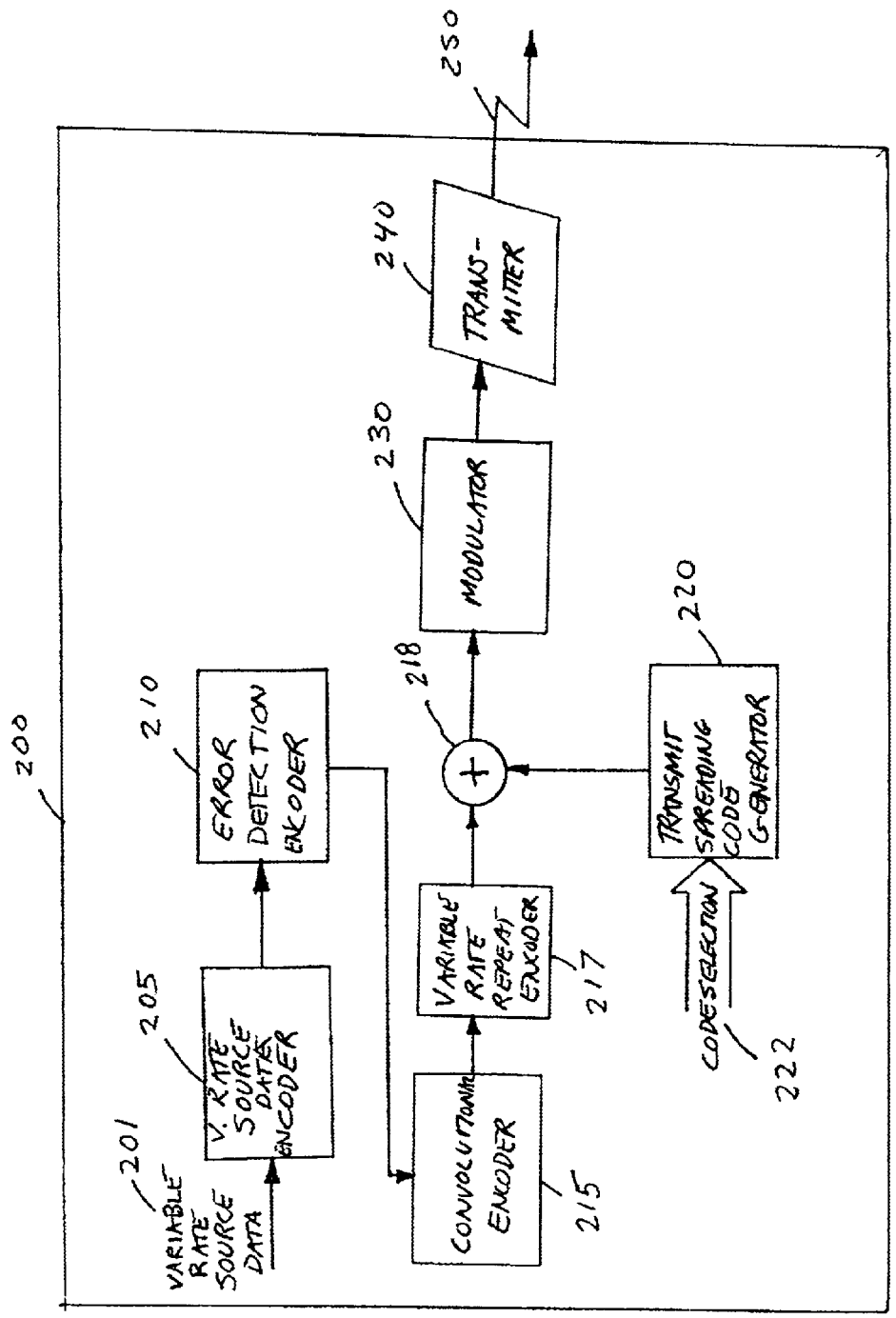
FIG. 2 is an exemplary block diagram of a transmitter that may be used according to an exemplary embodiment of the invention.

An exemplary CDMA system that may be used in conjunction with the present invention will now be described with reference to FIGS. 2 and 3. Turning to FIG. 2, an exemplary transmitter 200 for variable rate data transmission is illustrated. Such a transmitter could be located in either a mobile station 140 or a base station 120. A data information source 201, such as a voice data signal, is converted from analog format to digital format in a conventional variable rate data source coder 205 and encoded in one of the four possible rates. The digital bit stream generated by the data source coder 205 may be further processed in an error detection encoder 210, such as a CRC encoder, that adds redundancy that increases the bandwidth or bit rate of the transmission. As will be appreciated by those skilled in the art, CRC coding involves creating a set of parity bits at the transmitter from the information bits desired to be transmitted. The parity bits constitute a "check word" specific to a given sequence of bits. The check word may be appended to the sequence so that both are processed in the same manner, both are transmitted through the communications channel together, and both are processed through the same decoder at the receiver. A CRC calculator in the receiver may then generate parity bits corresponding to the decoded message bits that were received. The receiver-calculated check word may then be compared with the decoded check word that was received with the message. Any non-compliance indicates an error detected in the transmission. As described above CRC check bits are used in conjunction with rates 1 and 2 in systems which are designed in accordance with IS-95.

The data signal may then be further encoded using a convolutional encoder 215. A typical convolutional encoder is described by its rate and is formed using a shift register (not shown) in which information bits to be encoded are shifted into the register and the coded bits are output. The coded bits are combinations (linear algebraic functions) of the contents of the shift register and the most recent input bit. These combinations vary, depending on the code used, as will be appreciated by those skilled in the art. Convolutional error correcting codes may also be used in conjunction with error detection codes, such as a CRC described above, to provide a more robust communications system allowing for both the detection and correction of bit transmission errors.

According to a preferred exemplary embodiment of the invention, a rate ½ convolutional encoding with tail bits is used; however, one skilled in the art will realize that other convolutional encoding schemes may also be used according to the present invention. Block encoding schemes may also be used. The convolutionaly encoded signal is input to a variable rate repeat encoder 217 which inserts an appropriate number of repeat bits corresponding to the rate used by the speech encoder (e.g., rate 1=0 bits; rate 2=192 bits; rate 3=288 bits; and rate 4=336 bits). The coded bits are then interleaved and scrambled. Then certain bits are replaced with power control bits. Spread spectrum modulation and transmission follow. As mentioned earlier the power level for each rate is different, so that the energy per error detection encoded bit is kept constant.

In response to a spreading code selection signal 222 from a suitable control mechanism, such as a programmable microprocessor (not shown), a particular spreading code is generated by a transmit spreading code generator 220, which may be a Walsh code generator, for example. The selected spreading code is summed in a modulo-2 adder 218 with the coded information signal from the variable rate repeat coder 217. It will be appreciated that the modulo-2 addition of two binary sequences is essentially an exclusive-OR operation in binary logic. The modulo-2 summation effectively "spreads" each bit of information from the coder 217 into a plurality of "chips". The coded signal output by the adder 218 is used to modulate a radio frequency (RF) carrier using any one of a number of modulation techniques, such as QPSK, in a modulator 230. The modulated carrier is then transmitted over an air interface 250 by way of a conventional radio transmitter 240 over a traffic channel. It is appreciated that pilot channels, sync channels, and paging channels are also present but are not described in detail herein as they are commonly known and understood for use in CDMA systems by those skilled in the art.

Figure 3:
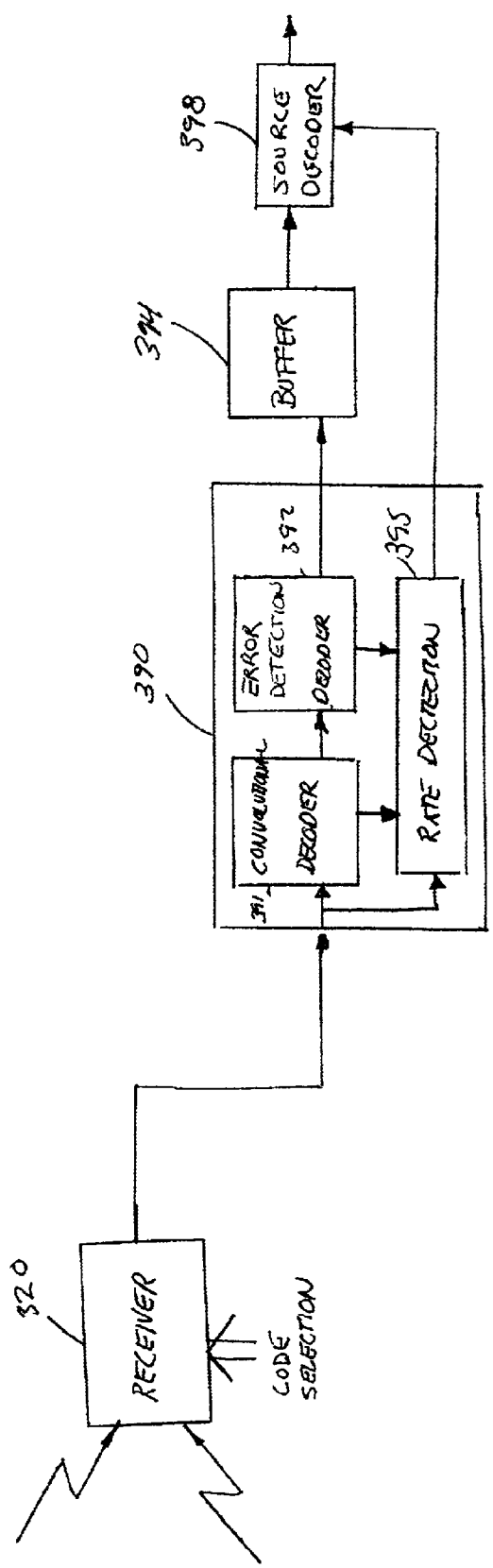
FIG. 3 is an exemplary block diagram of a receiver that may be used according to an embodiment of the invention.

Turning to FIG. 3 an exemplary receiver is shown for use with the present invention which may also be located in a mobile station 140 or base station 120. A plurality of the coded signals overlapping in the allocated frequency band are received together in the form of a composite signal waveform at a radio receiver 320.

The receiver performs downconversion and despreading producing detected bit values. Ideally, these are soft values related to the likelihood of the bit values. Typically soft bit values are +/− A, where the sign indicates the bit value and A is a confidence factor. In any event, the output signals of the receiver 320 are applied to a processor 390 for detecting the variable rate in conjunction with convolutional decoding and CRC decoding. The convolution decoder 391 and receiver error correction decoder (CRC) 392 exploit the processes applied by convolutional encoder 215 and the transmitter error correction encoder 217, to accurately recover the transmitted bit stream. Each partially decoded frame is temporarily stored in buffer 394 while rate detection occurs. The received bit stream is input to the processor and after determination of the rate and decoding, the resulting digital information is converted into analog format (e.g., speech) by a source decoder 398 using the rate information provided by variable rate detector 395. The variable rate detector 395 may be implemented according to a number of embodiments that are described in detail below with respect to FIGS. 4–7.

A first exemplary embodiment of rate detection according to the present invention will now be described in conjunction with FIGS. 4A and 4B.

According to a first exemplary embodiment of the invention, for each of the four rates 1–4, the most likely sequence of bits transmitted is one that maximizes the total correlation with the received sequence of soft bits at the receiver and a corresponding postulated sequence of bits. In other words, if the received sequence of soft bits is $$r = \{r_1, r_2, \ldots r_N\}, \quad (1)$$

then the most likely sequence $b_k$ of transmitted bits is one that maximizes the correlation $$c(k) = \sum_{l=1}^{N} b_{lk} r_l. \quad (2)$$

The soft bit values are typically the output bits of a receiver, for example a RAKE receiver. The possible received sequences are, in general, different for each of the four rates. Furthermore, for each of the lower rates (e.g., rates 2–4), each allowable sequence will be made up of sub-sequences of repeated bits.

Under high signal to noise ratios, the values of the maximum correlations when different rates are transmitted scale as $\sqrt{8}:\sqrt{4}:\sqrt{2}:1$ for rates 4, 3, 2, and 1 respectively. Thus, the conceptual algorithm for determining the rate of transmission may be thought of as follows:

(a) Calculate the possible sequence $b^{\{i\}}$ that maximizes the correlation $c^{\{i\}}$ as defined by equation 2, with rate i being postulated.

(b) Choose the rate to be one that maximizes $c^{\{i\}} \cdot \sqrt{\sqrt{2}^{-i}}$ It should be noted that the embodiment described above applies in the same fashion whether the variable rate detector 395 operates on the data as received (i.e., convolutionally encoded) or operates on the data after it has been convolutionally decoded by detector 391. Various decoding methods for convolutional codes exist. One of the best techniques is Viterbi's maximum likelihood algorithm. As one form of Sequential Maximum Likelihood sequence estimation (SMLSE), the Viterbi algorithm permits equipment simplification while obtaining the full performance benefits of maximum likelihood decoding. The decoder structure is relatively simple for short constraint length codes, making decoding feasible at high rates of up to 100 Mbits per second. Viterbi decoding is well known to those skilled in the art and a complete description of Viterbi's algorithm can be found in "The Viterbi Algorithm" by G. David Forney, Jr. *Proceedings of the IEEE*, Volume 61, No. 3, March 1973, which is hereby expressly incorporated by reference.

When the convolutional coding is not exploited, for example, only the repeat coding is used, the most likely sequence in each rate is determined by a soft combining of the soft values that correspond to the repeated bits that were transmitted at that rate, and the correlation $c^{\{i\}}$ is the sum of the absolute values of such soft combined values.

Figure 4A:
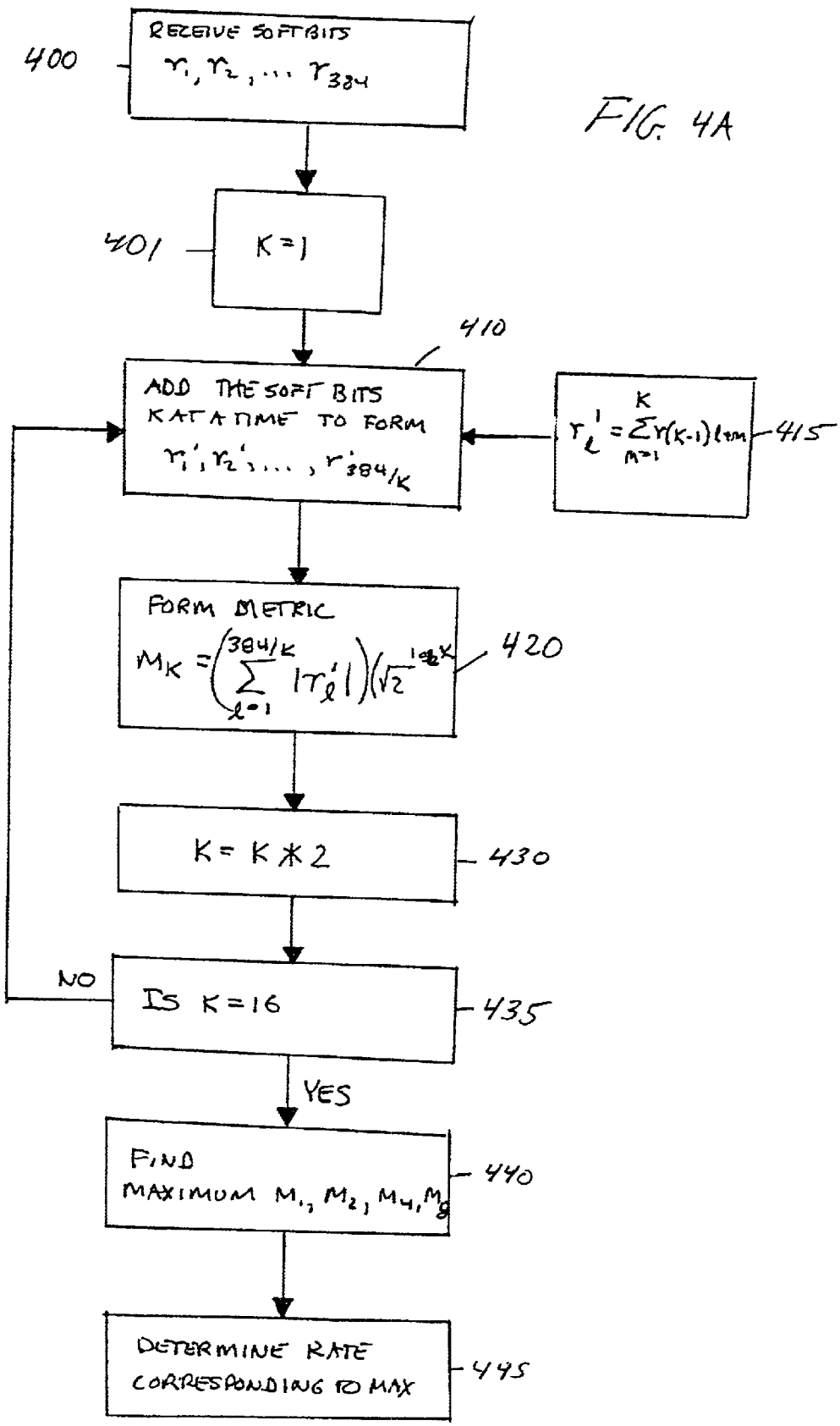
FIG. 4A is a flow chart for rate detection without use of convolutional coding according to a first exemplary embodiment of the invention.
Figure 4B:
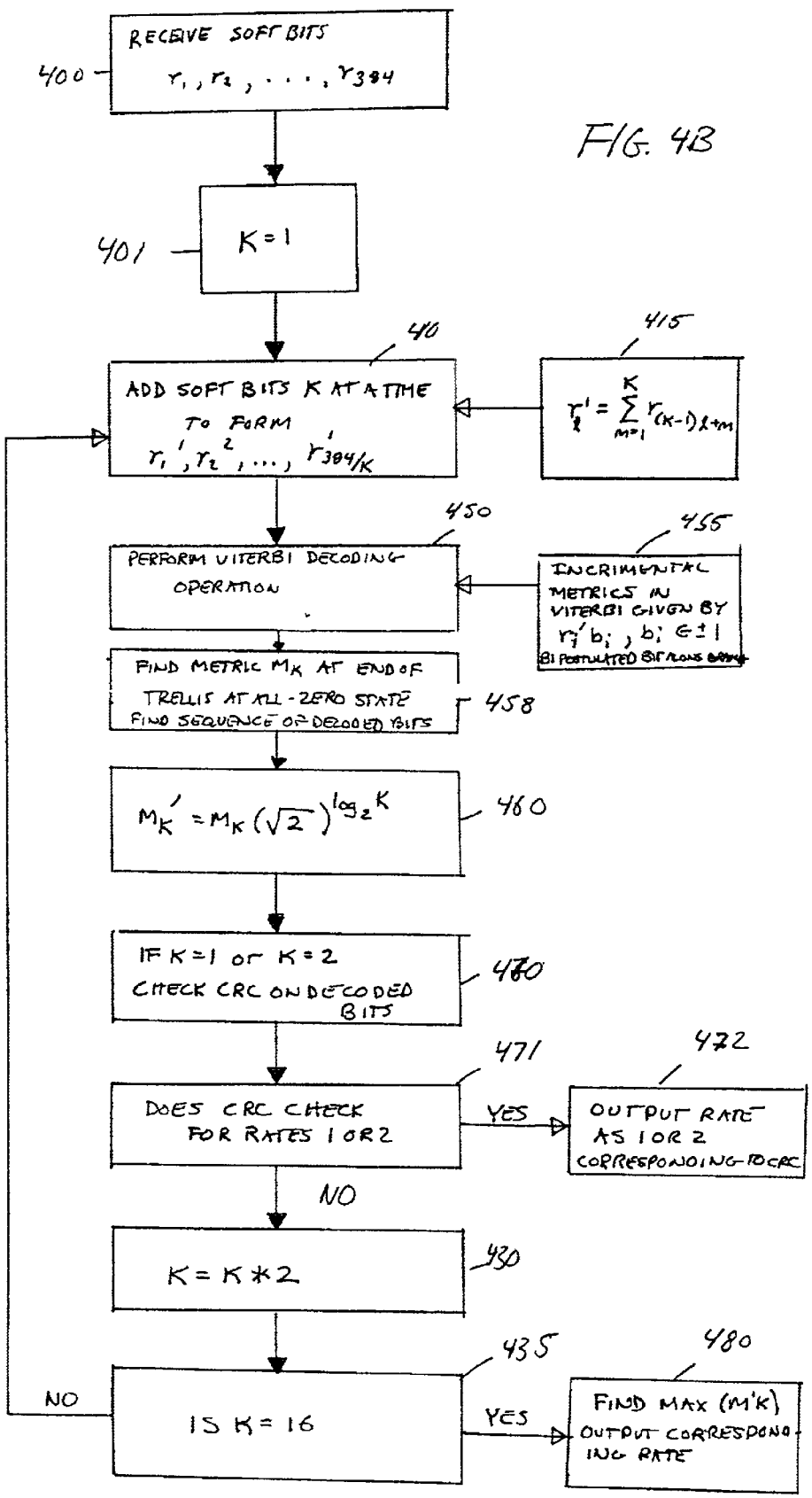
FIG. 4B is a flow chart for rate detection with use of convolutional coding according to a first exemplary embodiment of the invention.

Turning to FIG. 4A, an exemplary embodiment of rate detection according to the correlation expressed in Equation 2 is illustrated wherein rate detection is performed apart from any convolutional decoding. First a sequence of soft bits are received 400. Next the initial rate (K) is postulated to be 1. The received soft bits are then added K at a time to form a postulated sequence of received bits 410. This operation is illustrated in block 415. Next the metric is formed 420 by the summation of the absolute values of soft combined postulated sequence expressed as:

$$M_K = \left( \sum_{l=1}^{384/K} |r'_l| \right) \left( \sqrt{2}^{-\log_2 K} \right) \quad (3)$$

Where $r'_l = \Sigma r_l$

The rate is then increased by a factor of two 430 and it is determined if all of the possible rates have been evaluated, i.e., in this example when K=16 at step 435. Steps 410–430 are repeated for each of the other three rates. It is then determined which of the four postulated rates produced the maximum correlation 440 between the soft bits and postulated bits. The rate is then determined to be the rate corresponding to the determined maximum correlation 445. Alternatively, weights other than $$\left( \sqrt{2}^{-\log_2 K} \right)$$

which may be determined empirically, may be used.

When the convolutional coding is exploited, the most likely sequence is determined using a Viterbi decoder (as described above) utilizing a correlation metric, and the correlation $c^{\{i\}}$ is the metric at the all-zero state (due to the use of tail bits) at the last stage of the decoding trellis. Turning to FIG. 4B, an exemplary embodiment of rate detection according to Equation 2 is illustrated wherein convolutionally decoded information is used.

The steps for rate determination according to this embodiment are similar to those shown in FIG. 4A. However after receiving the soft bits 400 and formulating the postulated sequence of soft combined bits 410, the sequence of bits is then Viterbi decoded 450 to find the corresponding metric for the all zero state producing a sequence of decoded bits 458. The incremental metrics used by the Viterbi decoder supplied in step 455 are expressed as $r_i^l b_i$, $b_i \in \pm 1$. Next the correlation metric postulated for rate K is determined 460. Steps 410–460 are then repeated for all four rates. The rate is determined to be the one that corresponds to the best correlation determined 480.

As an $c^{\{i\}}$ alternative way of determining the rate (also illustrated in FIG. 4B), after determining the correlation metric for the postulated sequence, if the postulated rate is either rate one or two 470, then a CRC check can be performed 471. If the CRC checks then the postulated rate is determined to be the actual rate and it is outputted 472. No further processing to determine the rate is necessary. This is due to the fact that if the CRC checks then the chances of the postulated rate being incorrect are very small.

A more sophisticated rate detector may be obtained according to a second exemplary embodiment of the present invention. According to this embodiment the rate detector is implemented by minimizing the total squared error between the received sequence of soft bits and the postulated sequence of soft combined bits generated using an allowable sequence of bits and knowledge of the channel estimates. The metric using this detector can essentially be obtained from the maximum a priori (MAP) metric by removing all the a priori information (except for the channel estimates).

The metric for the kth codeword at rate i is given by $$M_k^{[i]} = 2 \sum_{l=1}^{N} \frac{r_l b_{kl}^{[i]}}{\sqrt{2^i}} - a \sum_{l=1}^{N} \sum_{m=1}^{M} \frac{|c_{lm}|^2}{2^i} \quad (4)$$

where $c_{l,m}$ is the mth channel gain at the lth time instant, and can be obtained from the pilot channel, and a is a gain coefficient that depends on the SNR or power in the traffic channel. For a RAKE receiver, the channel is a sum of magnitude squared channel taps. The method used according to this embodiment for rate detection maximizes the above metric over all codewords at all rates.

Figure 5A:
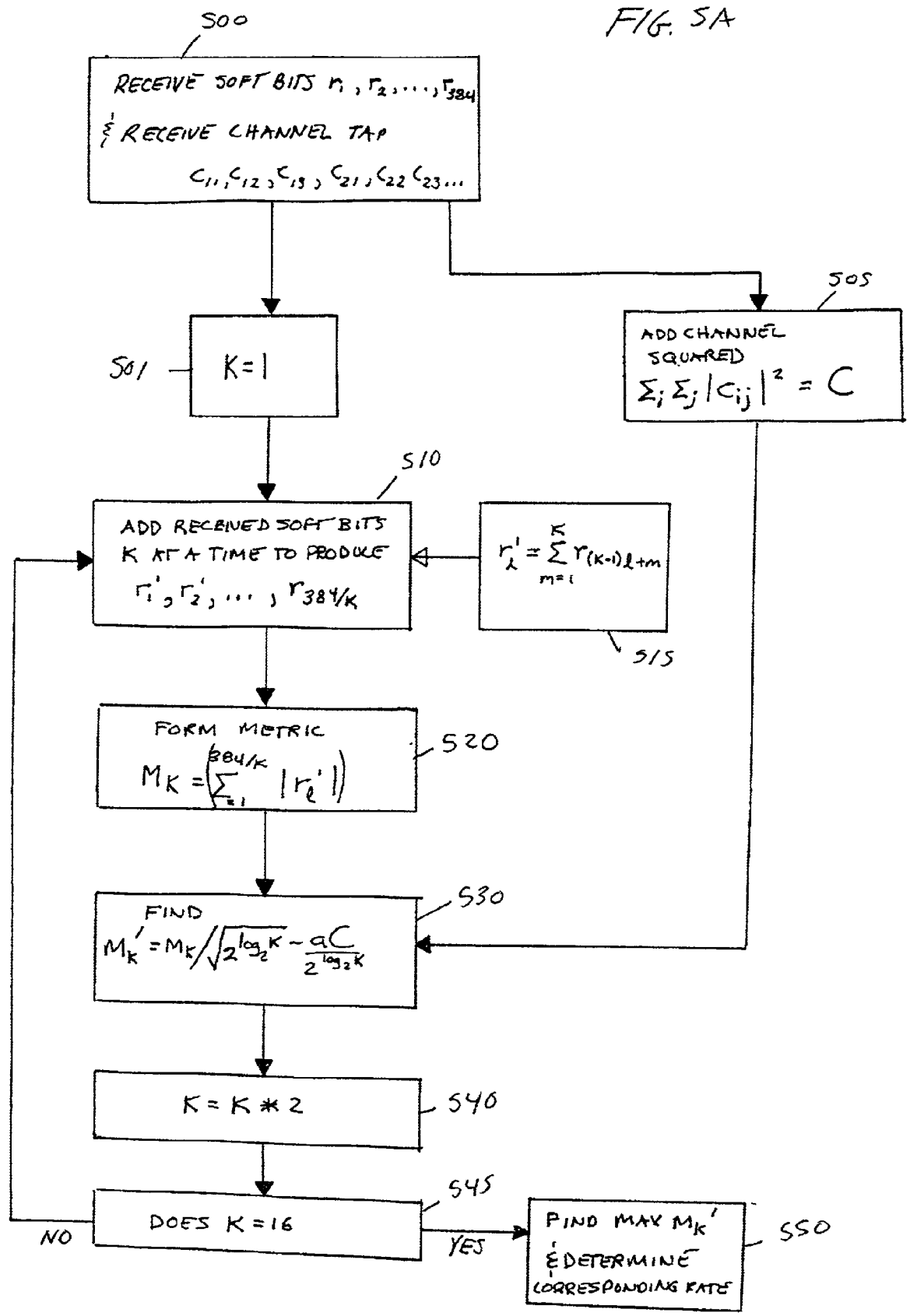
FIG. 5A is a flow chart for rate detection without use of convolutional coding according to a second exemplary embodiment of the invention.

Turning to FIG. 5A, an exemplary embodiment of rate detection according to Equation 4 will now be illustrated. First the soft bits are received along with channel estimates which may be determined from the pilot channel 500. Next at 501 the first postulated rate is set to be one. The squares of the channel estimates are summed at 505 for use in the metric calculation. The received soft bits are then added K at a time to formulate a postulated sequence of soft combined received bits 510, as illustrated in block 515. A metric for the sequence is then determined by taking the summation of the absolute values of the soft combined sequence 520. Next the correlation metric is determined for the postulated sequence of bits corresponding to rate one according to Equation 4 (as described above) 530. The rate is increased 540. Steps 510–530 are repeated for all four rates 545. The rate is then determined to be the one that maximizes the correlation between the postulated sequence and soft sequence of received bits 550.

Figure 5B:
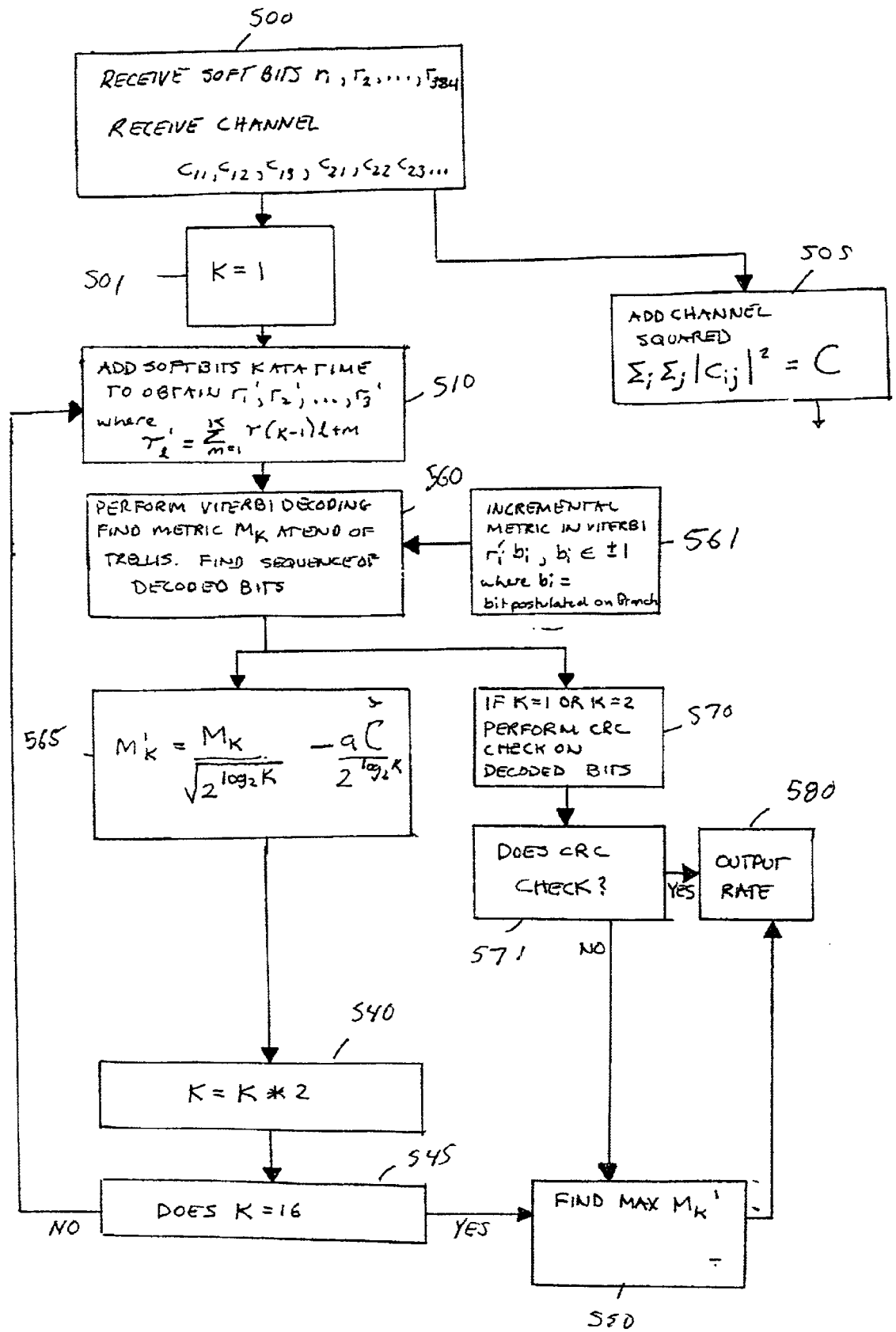
FIG. 5B is a flow chart for rate detection with use of convolutional coding according to a second exemplary embodiment of the invention.

As with the detector described above in accordance with the first exemplary embodiment, the above metric can be employed by exploiting the repeat coding, or by exploiting the convolutional coding also. One skilled in the art will appreciate that the first term in the metric is a scaled version of the correlation used in the rate detector according to the first exemplary embodiment of the invention. This embodiment is illustrated in FIG. 5B. Note the same steps 500, 501, 505, and 510 are performed; however, instead of only using the repeat coding of the sequence, Viterbi decoding is used 560 to determine a sequence of decoded bits which are in turn used to determine the correlation metric 565.

Furthermore, according to this embodiment the CRC information that is present in rates 1 and 2 may be used. If it is postulated that the decoded bits are at rates 1 or 2 then a CRC check can be performed 570. If the CRC checks 571 then the postulated rate is determined to be the actual rate and is output 580 as the rate. Efficiency of the rate detection is increased according to this embodiment because if the CRC checks, it is unlikely that any other rate is transmitted.

According to a third exemplary embodiment of the present invention an even more sophisticated rate detector may be achieved. Unlike the previous two embodiments the following rate detector uses knowledge of the signal to noise ratio (SNR) in the channel. It will be appreciated by those skilled in the art that the SNR can be estimated using signal strength and correlation measurements on the pilot and traffic channels, and by BER & FER measurements.

According to this exemplary embodiment, rate detection method is described that is optimal in the sense that the probability of rate detection error is minimized. According to this exemplary embodiment knowledge of the different structures associated with each of the four different rates, including the error detection encoding, the convolutional encoding, the repeat encoding, and the power level control can be exploited. Several other variations are also described based on this embodiment.

Figure 6:
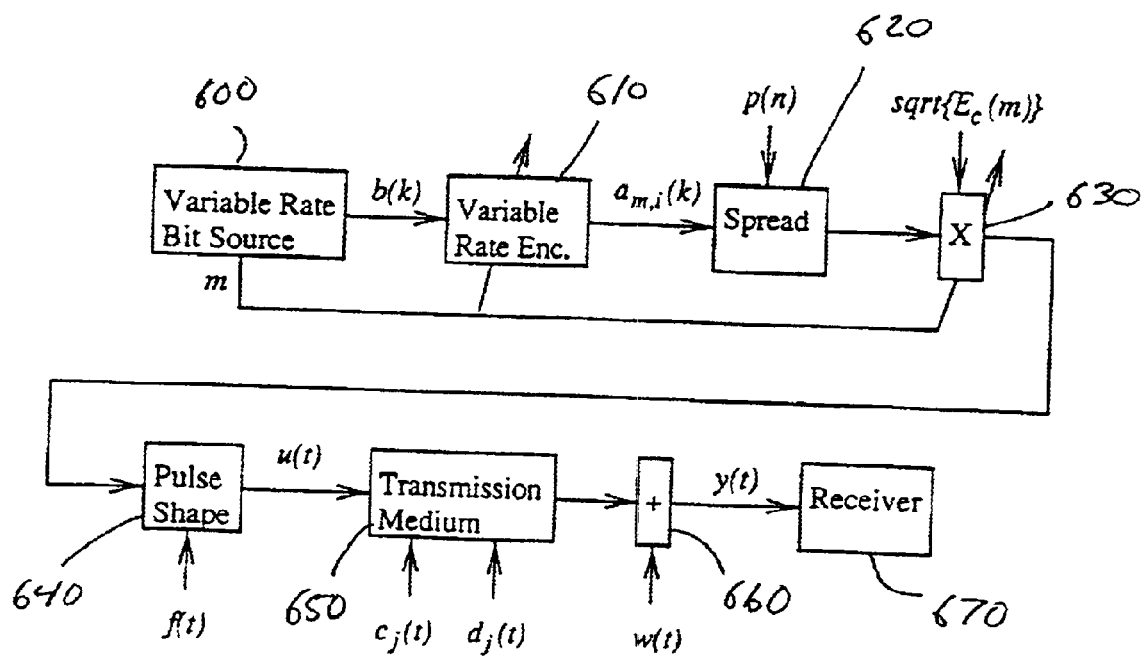
FIG. 6 is a block diagram for rate detection according to a third exemplary embodiment of the invention.

A simplified, complex baseband system model according to the third embodiment is shown in FIG. 6. During one frame period, the speech encoder can be modeled by a variable rate information bit source 600, which produces $N_b(m)$ information bits, denoted $\{b(k); k=0, N_b(m)-1\}$ according to the frame's rate m. The error detection encoding, convolutional encoding, repeat coding, interleaving, scrambling, and power control bit puncturing are represented by a block encoder 610, which produces a code word from the set $\{w_{m,i}; i=0, N_w(m)-1\}$. Code word $w_{m,i}$ consists of a series of Na code bits, denoted $\{a_{m,i}(k); k=0, N_a-1\}$, which are ±1 in value. The power control bits are always sent at the same power level, so they provide no information regarding which mode was sent and can be ignored. Power control bit insertion produces a puncturing of the block code, so that $N_a=384-2\cdot16=352$.

Walsh spreading and complex scrambling at block 620 can be represented by spreading by a factor $N_c$ ($N_c=64$) with sequence p(n), consisting of unity-magnitude, complex values. In addition, the energy-per-bit after tail bit insertion is the same for all four rates ($E_b$). Consequently, the energy-per-chip $E_c(m)$ can be expressed as:

$$E_c(m) = \frac{1}{2^m} \frac{E_b}{N_c} \tag{5}$$

Since it is desirable for the energy per error detection encoded bit to remain constant, power level controller 630 varies the transmit power in accordance with the energy-per-chip and rate m. The energy-per-bit for the information bits is expressed as $_{ym}E_b$. Values for $N_b(m)$, $N_w(m)$, and $_{ym}$ are provided in Table 1.

TABLE 1

Rate Parameters

| Quantity | Rate 1 | Rate 2 | Rate 3 | Rate 4 |
|---|---|---|---|---|
| $N_b(m)$ | 172 | 80 | 40 | 16 |
| CRC | 12 | 8 | 0 | 0 |
| tail | 8 | 8 | 8 | 8 |
| total | 192 | 96 | 48 | 24 |
| γm | 192/172 | 96/80 | 48/40 | 24/16 |
| $N_w(m)$ | $2^{172}$ | $2^{80}$ | $2^{40}$ | $2^{16}$ |

Pulse shaping is achieved by convolving with pulse shape f(t) at block 640, which is normalized to have unity auto-correlation at zero lag. Thus the transmitted signal can be represented by:

$$u(t) = \sqrt{\frac{1}{2^m} \frac{E_b}{N_c}} \sum_k a(k) \sum_n p(n) \delta(\lfloor n/N_c \rfloor - k) f(t - nT_c) \tag{6}$$

where $N_c$ is the spreading factor and $T_c$ is the chip period.

The transmitted signal passes through a transmission medium 650, which can be represented by, for example a set of discrete, time-varying channel taps with channel tap coefficients $\{c_j(t); j=0, J-1\}$ and channel tap delays $\{d_j(t); j=0, J-1\}$, (e.g., when the tap spacing is chosen based on the bandwidth of the transmitted signal). At the receiver, additive, white, Gaussian noise w(t) can be present with one-sided spectral density $N_0$. The resulting received signal is expressed as:

$$y(t) = \sum_j c_j(t)u(t - d_j(t)) \quad (7)$$

$$= \sqrt{\frac{1}{2^m}\frac{E_b}{N_c}} \sum_k a_{m,i}(k) \sum_n p(n)\delta(\lfloor n/N_c \rfloor - k) \sum_j c_j(t)f(t - nT_c - d_j(t)) + w(t)$$

The maximum a priori (MAP) estimator is the estimate that minimizes the probability of mode detection error, and it is a special case of the Bayes criterion for which any error is given equal importance. For rate detection according to the present invention, the MAP estimate is represented as:

$$m_{det} = arg\, \max_m\, Pr\{H_m|y(t)\} \quad (8)$$

where $H_m$ denotes the hypothesis that rate m was sent and y(t) denotes the received data waveform.

The probability that rate m was sent is the probability that any of the code words in rate m was sent. Since the code words for rate m are distinct, $$Pr\{H_m|y(t)\} = \sum_{i=0}^{N_w(m)-1} Pr\{w_{m,i}|y(t)\} \quad (9)$$

Therefore according to Bayes theorem, $$Pr\{w_{m,i}|y(t)\} = \frac{Pr\{y(t)|w_{m,i}\}Pr\{w_{m,i}\}}{Pr\{y(t)\}} \quad (10)$$

The a priori probability of sending a particular code word corresponding to a particular rate is expressed as:

$$Pr\{w_{m,i}\} = \alpha_m \beta_{i|m} \quad (11)$$

where $\alpha_m$ denotes the a priori probability that rate m was sent and $\beta_{i|m}$ denotes the a priori probability that $w_{m,i}$ was sent given rate m was sent. One skilled in the art will appreciate that these probabilities are a function of the speech encoder algorithm that is used. Substituting equations (9)–(11) into equation (8) and dropping the term $Pr\{y(t)\}$, which is common to all hypotheses, the MAP rate estimate is expressed as:

$$m_{det} = arg\, \max_m\, \alpha_m \sum_{i=0}^{N_w(m)-1} Pr\{y(t)|w_{m,i}\}\beta_{i|m} \quad (12)$$

Various approximations can be made to simplify a rate detector which uses equation (12) to determine the rate of received information. First, the term $\beta_{i|m}$ is simplified, by assuming that all code words for a particular mode are equi-likely. This gives:

$$\beta_{i|m} \approx \frac{1}{N_w(m)} \quad (13)$$

Second, the term $Pr\{y(t)|w,i\}$ is simplified through a series of approximations and assumptions. For white noise, this likelihood can be expressed as:

$$Pr\{y(t)|w_{m,i}\} = K\exp\{J(m,i)\} \quad (14)$$

where K is a constant that can be dropped and $$J(m,i) = \frac{1}{N_0}\int -|y(t) - \hat{y}(m,i)|^2\, dt \quad (15)$$

$$\hat{y}(m,i) = \sqrt{\frac{1}{2^m}\frac{E_b}{N_c}} \sum_k a_{m,i}(k) \sum_n p(n)\delta(\lfloor n/N_c \rfloor - k) \sum_j c_j(t)f(t - nT_c - d_j(t)) \quad (16)$$

Substituting (16) in (15) gives:

$$J(m,i) = A + B(m,i) + C(m,i) \quad (17)$$

where $$A = -\frac{1}{N_0}\int |y(t)|^2\, dt \quad (18)$$

$$B(m,i) = \frac{2}{\sqrt{N_o}}\sqrt{\frac{1}{2^m}\frac{E_b/N_0}{N_c}} \sum_k a_{m,i}(k)\mathcal{R}\left\{\sum_n p^*(n)\delta(\lfloor n/N_c \rfloor - k)\sum_j c_j^*(t)f^*(t - nT_c - d_j(t))y(t)dt\right\} \quad (19)$$

$$C(m,i) = \frac{1}{2^m}\frac{E_b/N_0}{N_c}\sum_k\sum_{k'} a_{m,i}(k)a_{m,i}(k')\sum_n\sum_{n'} p^*(n)p(n')\delta(\lfloor n/N_c \rfloor - k)\delta(\lfloor n'/N_c \rfloor - k')\cdot$$

$$\sum_j\sum_{j'}\int c_j^*(t)c_{j'}(t)f^*(t - nT_c - d_j(t))f(t - n'T_c - d_{j'}(t))dt \quad (20)$$

where superscript * denotes complex conjugation and $\mathcal{R}\{\cdot\}$ denotes taking the real part of the operand. Term A is independent of rate m, so it can be dropped. Terms B(m,i) and C(m,i) can be further simplified by assuming that the channel taps change slowly, on the order of the code bit period $N_cT_c$, and that the support of the pulse shape is less than the code bit period. This gives $$B(m,i) \approx \frac{2}{\sqrt{N_o}}\sqrt{\frac{1}{2^m}\frac{E_b/N_0}{N_c}}\sum_k a_{m,i}(k)\mathcal{R}\left\{\sum_j c_j^*(kN_cT_c)\sum_n p^*(n)\delta(\lfloor n/N_c\rfloor - k)r(nT_c + d_j(kN_cT_c))\right\} \quad (21)$$

$$C(m,i) \approx \frac{-1}{2^m}\frac{E_b/N_0}{N_c}\sum_k\sum_{k'} a_{m,i}(k)a_{m,i}(k')\sum_j\sum_{j'} c_j^*(kN_cT_c)c_{j'}(k'N_cT_c)\cdot$$

$$\sum_n\sum_{n'} p^*(n)p(n')\delta(\lfloor n/N_c\rfloor - k)\delta(\lfloor n'/N_c\rfloor - k')r_{ff}(nT_c - n'T_c + d_j(kN_cT_c) - d_{j'}(k'N_cT_c)) \quad (22)$$

where $$r(t) = \int f^*(t'-t)y(t')dt' \quad (23)$$

$$r_{ff}(\tau) = \int f^*(t')f(t'+\tau)dt' \quad (24)$$

Observe that r(t) is obtained by filtering the received signal by a filter matched to the transmit chip pulse shape. Also, $r_{ff}(\tau)$ is the autocorrelation function for the transmit chip pulse shape.

Term B(m,i) can be expressed as:

$$B(m,i) \approx \frac{2}{\sqrt{N_o}}\sqrt{\frac{1}{2^m}\frac{E_b/N_0}{N_c}}\sum_k a_{m,i}(k)a_{soft}(k) \quad (25)$$

$$a_{soft}(k)\mathcal{R}\left\{\sum_j c_j^*(kN_cT_c)x(kN_cT_c + d_j(kN_cT_c))\right\} \quad (26)$$

$$x(kN_cT_c + d_j(kN_cT_c)) = \sum_{n=kN_c}^{kN_c+N_c-1} p^*(n)r(nT_c + d_j(kN_cT_c)) \quad (27)$$

Thus, term B(m,i) can be expressed in terms of soft bit values $a_{soft}(k)$, which are the result of RAKE combining correlations x(t) using channel tap information.

Term C(m,i) can be further simplified through a series of approximations. First, it is assumed that the channel tap delays are integer multiples of the chip period, so that $$d_j(kN_cT_c) = l_j(k)T_c \quad (28)$$

where $l_j(k)$ is an integer. Second, the pulse shape is approximately Nyquist, so that $$r_{ff}(iT_c) = \delta(i) \quad (29)$$

for integer i. Substituting equations (28) and (29) in equation (22)

$$C(m,i) \approx \frac{-1}{2^m}\frac{E_b/N_0}{N_c}\sum_k\sum_{k'} a_{m,i}(k)a_{m,i}(k') \quad (30)$$

$$\sum_j\sum_{j'} c_j^*(kN_cT_c)c_{j'}(k'N_cT_c)D(l_j(k), l_{j'}(k')) \text{ where}$$

$$D(l_j(k), l_{j'}(k')) = \sum_n p^*(n)p(n + l_j(k) - l_{j'}(k')) \quad (31)$$

$$\delta(\lfloor n/N_c\rfloor - k)\delta(\lfloor n + l_j(k) - l_{j'}(k')\rfloor/N_c\rfloor - k')$$

Next, it is assumed that the spreading sequence p(n) has ideal aperiodic autocorrelation properties, so that the last summation in equation (22) is nonzero only when $l_j(k)=l_{j'}$, (k'). Then equation (31) becomes $$D(l_j(k), l_{j'}(k')) = \sum_n \delta(\lfloor n/N_c\rfloor - k)\delta(\lfloor n/N_c\rfloor - k')\delta(l_j(k) - l_{j'}(k')) \quad (32)$$

$$= N_c\delta(l_j(k) - l_{j'}(k'))\delta(k - k')$$

Substituting equation (32) in equation (30) gives $$C(m,i) \approx -\frac{1}{2^m}(E_b/N_0)\sum_k\sum_j |c_j(kN_cT_c)|^2 \quad (33)$$

From equating (14), (17), (25) and (32), $$Pr\{y(t)|w_{m,i}\} \approx \exp\{J'(m,i)\} \quad (34)$$

where $$J'(m,i) = \sqrt{\frac{1}{2^m}\frac{E_b/N_0}{N_c}} \quad (35)$$

$$\sum_k\left[\frac{2}{\sqrt{N_o}}a_{m,i}(k)a_{soft}(k) - \sqrt{\frac{1}{2^m}N_cE_b/N_0}\sum_j |c_j(kN_cT_c)|^2\right]$$

Finally, the MAP rate estimate can be approximated by substituting equations (15), (34) and (35) in equation (12), giving $$m_{det} = \arg\max_m \frac{\alpha_m}{N_w(m)} \quad (36)$$

$$\sum_{i=0}^{N_w(m)-1}\exp\left\{\sqrt{\frac{1}{2^m}\frac{E_b/N_0}{N_c}}\cdot\sum_k\left[\frac{2}{\sqrt{N_o}}a_{m,i}(k)a_{soft}(k) - \sqrt{\frac{1}{2^m}N_cE_b/N_0}\sum_j |c_j(kN_cT_c)|^2\right]\right\}$$

Extrinsic information not found in the coding can also be used to make a decision regarding the rate. Examples of such information are the probabilities of the various rates, allowable sequences of rate changes and the like. For example, it is known that the rate has to go through the progressive sequence 1, 2, 3, and 4 when the rate is lowered. However, one can switch back directly from rate 4 to rate 1 when the rate is being increased. Thus, it is evident that if rate 1 is detected in the previous frame and rate 3 or 4 is detected in the present frame, an error has been made. The use of such information, just as the CRC information, can help to improve the rate detection process.

The approach can be used even when all assumptions do not hold. Alternatively, the approximate forms can be replaced by exact forms when the approximations do not hold.

The present invention has been described with respect to the IS-95 system standard. The present invention is also applicable to the higher bit rate vocoder found in the J-STD-018 standard, for example. Here, the bit rates are higher but the same principles apply. Each of the four rates has a CRC. Thus, for the present invention, the CRC would be checked for each rate, not just the first two. Also, at the transmitter, there is puncturing of the convolutional encoder. At the receiver, the convolutional decoder would insert erasures to account for the puncturing at the transmitter.

While described in the context of CDMA, on skilled in the art will also recognize that the present invention is applicable to any system in which the information is transmitted using different codes. The information need not be at different rates, for example. The invention is not limited to four possibilities and is not limited to convolutional codes in conjunction with repeat coding.

The present invention has been described by way of example, and the modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims rather than the preceding description, and all variations and equivalence which followed in the range of the claims are intended to be embraced therein.

What is claimed is:

1. A method of determining the most likely rate at which a received signal was encoded from among a plurality of predetermined postulated rates, comprising:
   decoding said received signal at each said postulated rate, to generate a corresponding decoded signal and a corresponding decoding metric;
   modifying each said decoding metric based on the corresponding postulated rate and a maximum a priori rate estimator to generate a corresponding modified decoding metric; and
   determining the most likely rate at which said received signal was encoded as being the postulated rate associated with the maximum said modified decoding metric.

2. A method of determining the most likely rate at which a received signal was encoded from among a plurality of predetermined postulated rates, comprising:
   decoding said received signal at a first postulated rate to generate a first decoded signal and a first decoding metric;
   modifying said first decoding metric based on said first postulated rate and a maximum a priori rate estimator to generate a first modified decoding metric;
   decoding said received signal at a second postulated rate to generate a second decoded signal and a second decoding metric;
   modifying said second decoding metric based on said second postulated rate and a maximum a prior rate estimator to generate a second modified decoding metric;
   decoding said received signal at a third postulated rate to generate a third decoded signal and a third decoding metric;
   modifying said third decoding metric based on said third postulated rate and a maximum a priori rate estimator to generate a third modified decoding metric; and
   determining the most likely rate at which said received signal was encoded as being the postulated rate associated with the maximum among said first modified decoding metric, said second modified decoding metric, and said third modified decoding metric.

3. A method of determining the most likely rate at which a received signal was encoded from among a plurality of predetermined postulated rates, comprising:
   demodulating said received signal at each said postulated rate to generate a corresponding sequence of soft bits;
   grouping said soft bits within each sequence based on the corresponding postulated rate;
   calculating the sum of the absolute values of each said sequence of groups; and
   determining the most likely rate at which said received signal was encoded as being the postulated rate associated with the maximum said sum.

4. The method of claim 3 further comprising modifying each said sum based on the corresponding postulated rate prior to determining said most likely rate.

5. The method of claim 3, wherein calculating the sum of the absolute values of each said sequence of groups comprises calculating $M_K$ for each postulated rate factor K (K=1, 4, 8, 16) according to the formula $$M_K = \left(\sum_{l=1}^{384/K} |r'_l|\right)\left(\sqrt{2}^{-\log_2^K}\right)$$

where $r'_l$ represents the sequence of received soft bits added K at a time.

6. A receiver unit, comprising:
   a receiver for receiving a sequence of bits encoded at one of a plurality of predetermined rates;
   a decoder for decoding said received sequence of bits at least two postulated rates selected from said plurality of predetermined rates said decoder generating a corresponding sequence of decoded soft bits and a corresponding decoding metric for each said postulated rate;
   a calculating unit for modifying each said decoding metric based on the corresponding postulated rate to generate a corresponding modified decoding metric; and
   a rate determining module for determining at which of said postulated rates said received sequence of bits was encoded as being the postulated rate associated with the maximum said modified decoding metric, and additionally considering a maximum a priori estimation.

7. A receiver unit, comprising:
   a receiver for receiving a sequence of bits encoded at one of a plurality of predetermined rates;
   a demodulator for demodulating said received sequence of bits at at least two postulated rates selected from said plurality of predetermined rates, said demodulator generating a corresponding sequence of soft bits for each postulated rate;
   a calculating unit for grouping said soft bits within each sequence based on the corresponding postulated rate and calculating the sum of the absolute values of each said sequence of groups; and
   a rate determining module for determining the most likely rate at which said received signal was encoded as being the postulated rate associated with the maximum said sum.

* * * * *